Dec. 10, 1963  L. M. HALLS  3,113,412
RECIPROCATING MOWER DRIVE
Filed April 27, 1961  5 Sheets-Sheet 3
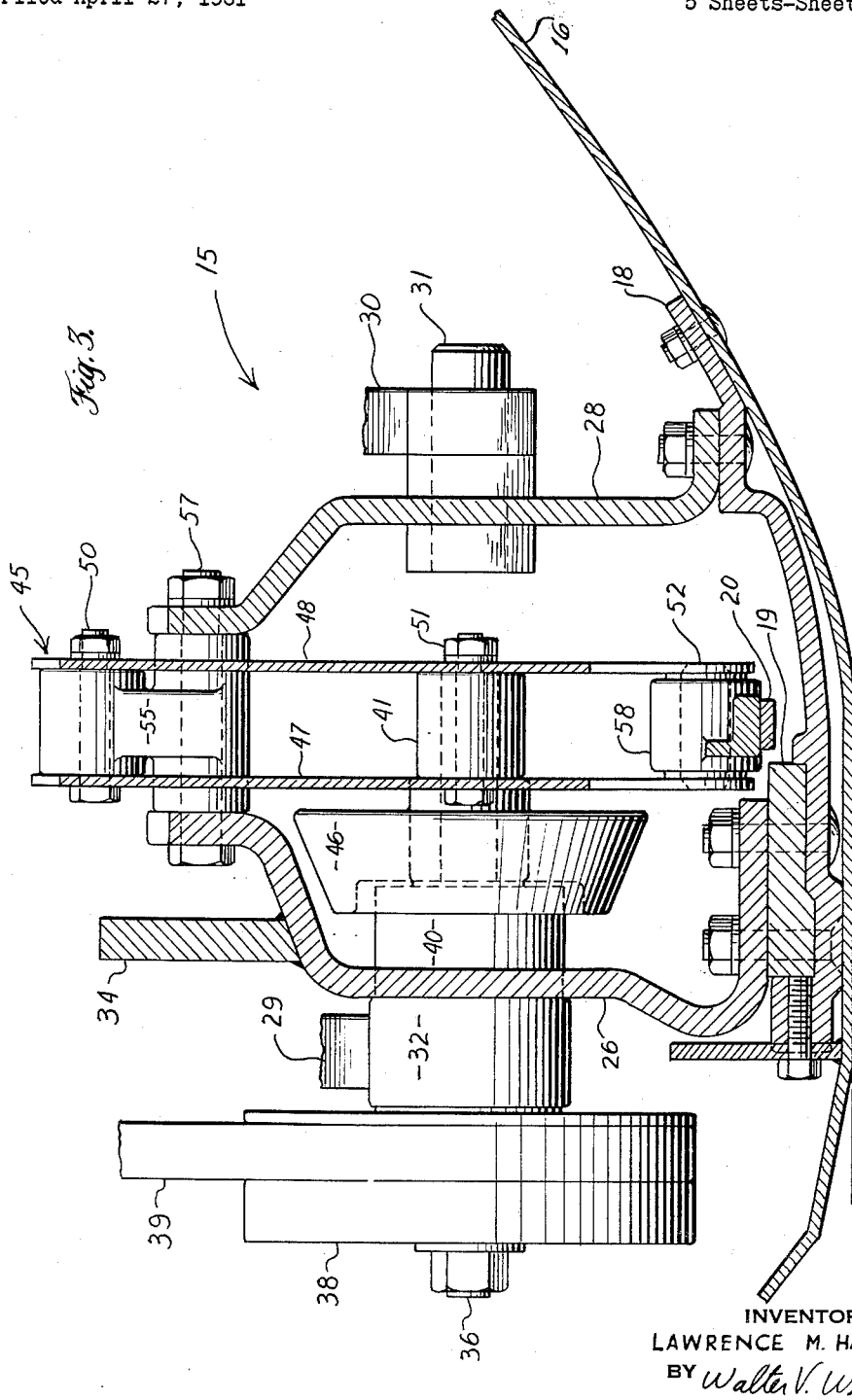
INVENTOR
LAWRENCE M. HALLS
BY Walter V. Wright
AGENT

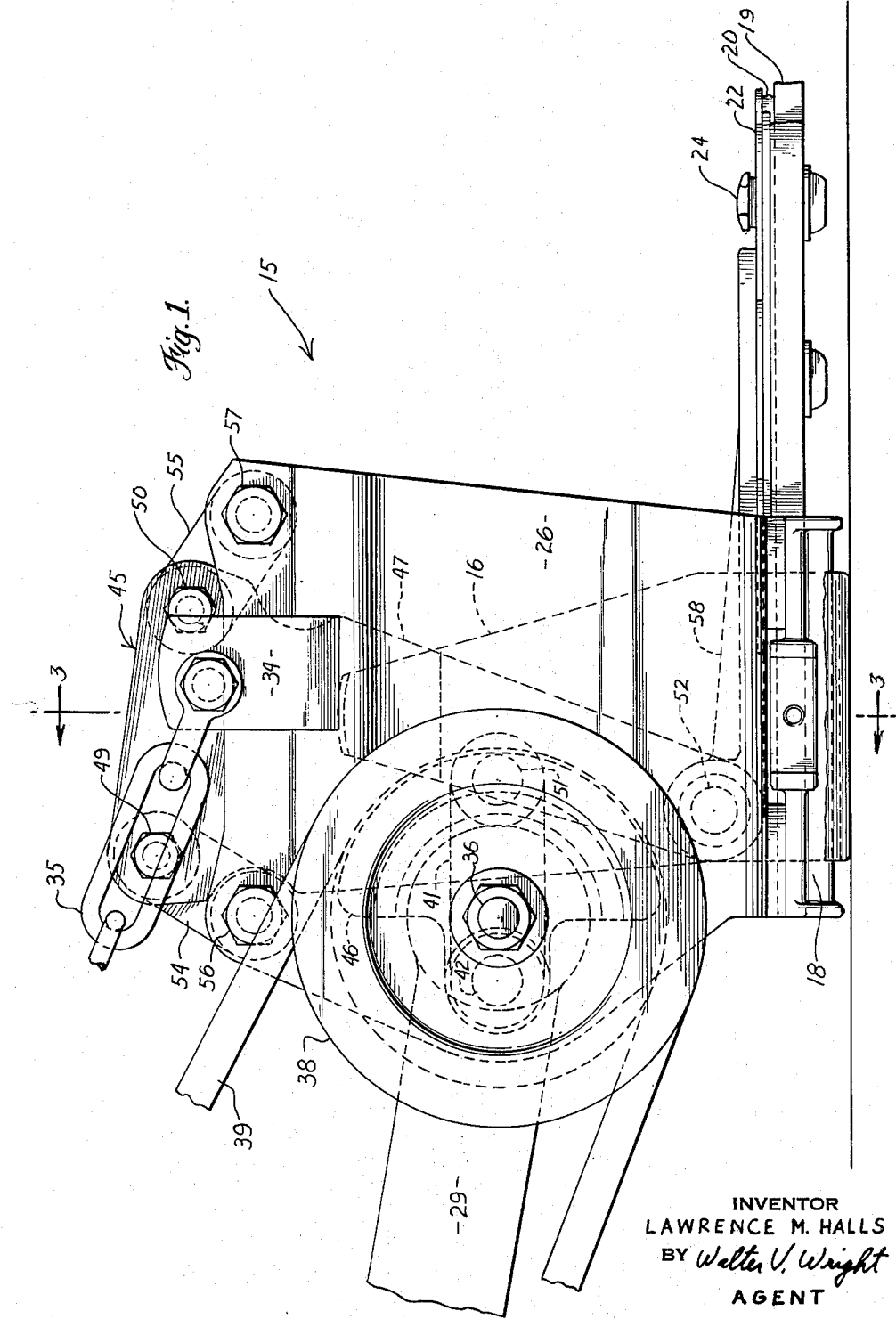

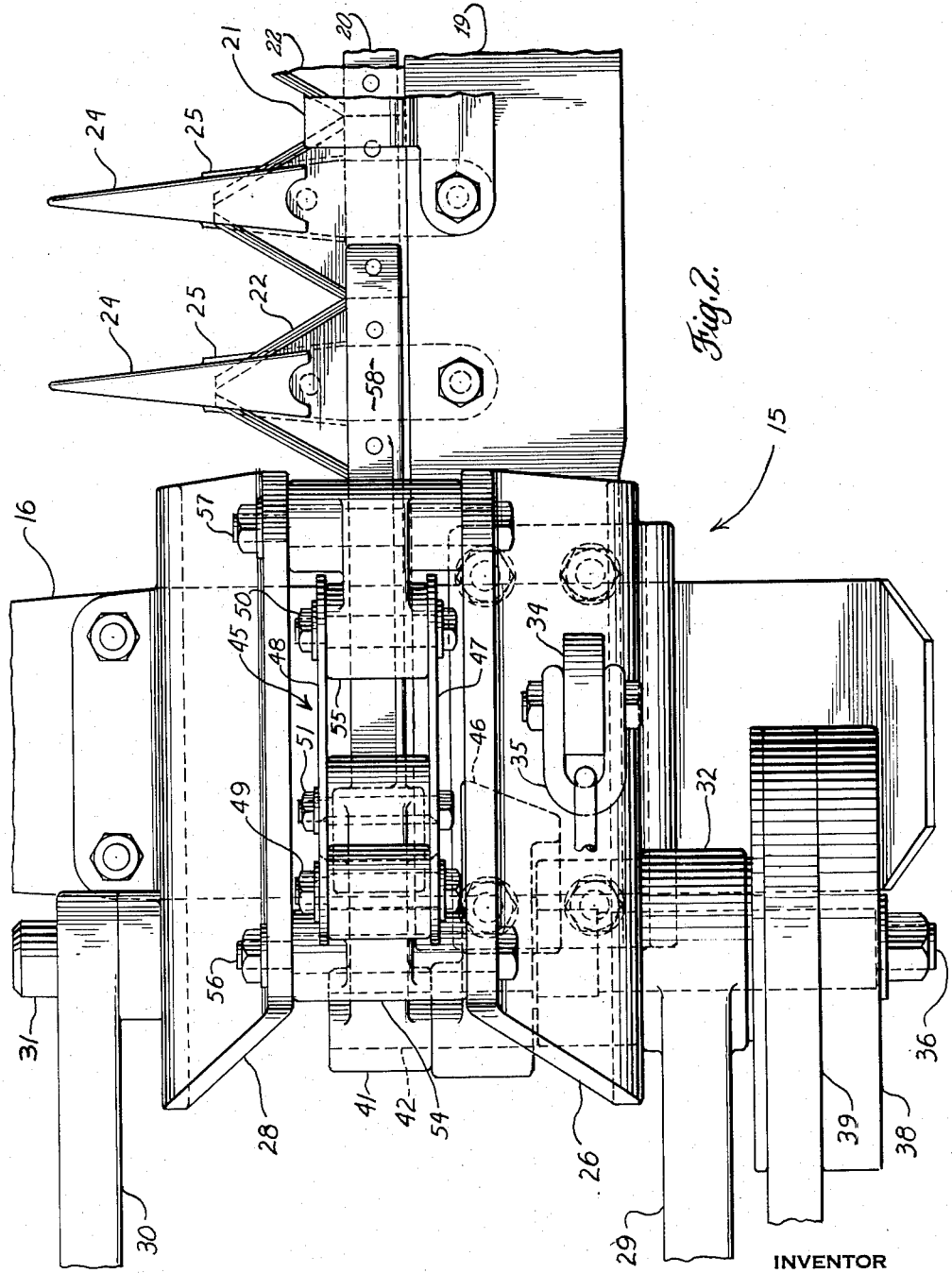

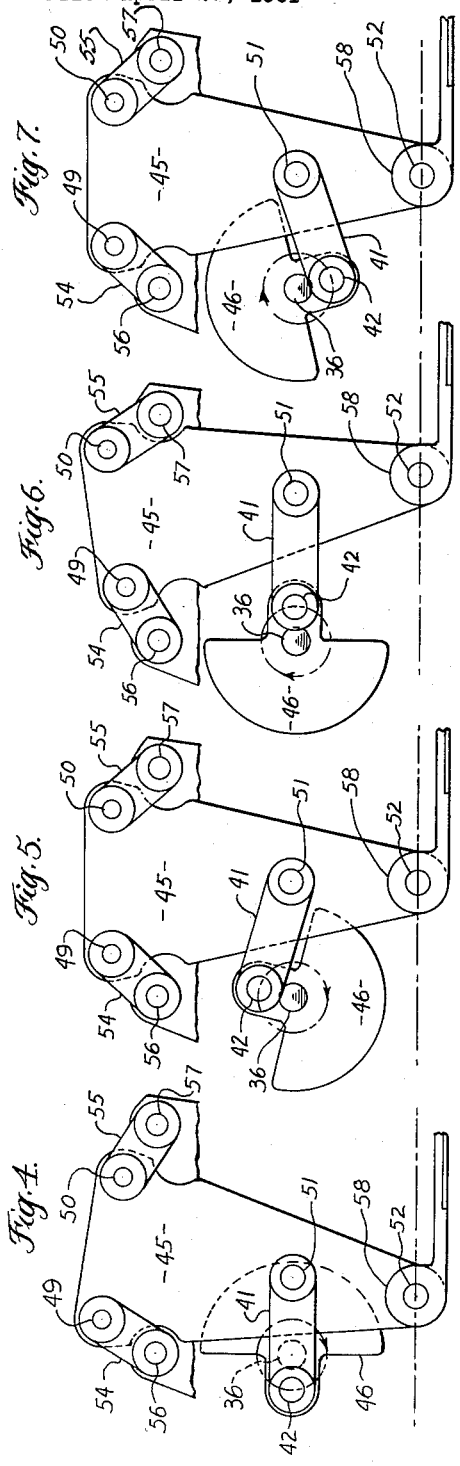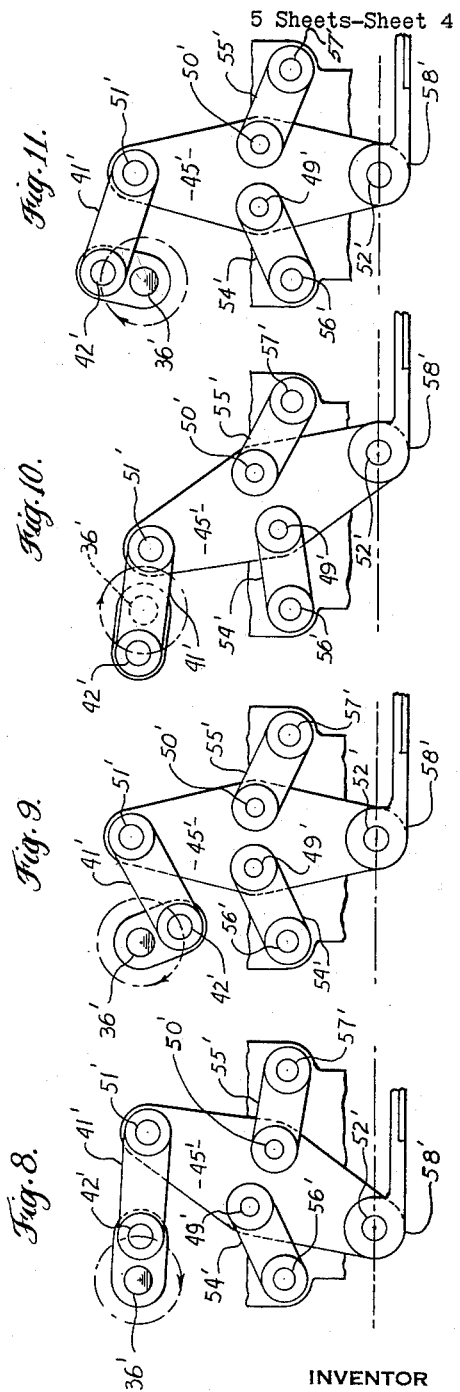

INVENTOR.
LAWRENCE M. HALLS
BY Walter V. Wright
AGENT

United States Patent Office 3,113,412
Patented Dec. 10, 1963

3,113,412
RECIPROCATING MOWER DRIVE
Lawrence M. Halls, New Holland, Pa., assignor to Sperry Rand Corporation, New Holland, Pa., a corporation of Delaware
Filed Apr. 27, 1961, Ser. No. 105,940
9 Claims. (Cl. 56—296)

This invention relates to mechanism for driving, or guiding, a member, such as the sickle bar of a reciprocable mower, in straight line reciprocation.

In many mechanisms, such as reciprocable mowers, it is desirable to drive a member in straight line reciprocation wherein the drive mechanism must be located to one side of the plane of reciprocation of the driven member. In the case of mowers, the sickle bar, or reciprocable member, is disposed as close to the ground as possible. The drive mechanism is therefore located above the plane of reciprocation of the sickle bar.

Prior to this invention, the usual procedure followed in designing such drives was to provide approximately straight line motion of a driving member, pivotally attach the driving member to a member which was to be driven, and provide guides for the driven member which limited that member to movement in a straight line. In the case of mowers, the drive member usually rotates or oscillates through an arc.

In several ways, the above drive arrangements are not entirely satisfactory. For one thing, arcuately traveling drive members apply at least two components of force to the driven member: a tangential component and a radial component. While one component of force drives the driven member, the other component of force acts against the guides and attempts to move the driven member out of its path of reciprocation. This latter component of force represents inefficiency which serves merely to wear out guides and produce unnecessary stresses which shorten the service life of the mechanism.

Agricultural mowers are one example of machines which commonly employ the above type of drive. Mowers operate in close proximity to the ground whereby the relatively moveable parts are subject to the abrasiveness of much dust and grid. This is particularly hard on guide bearing surfaces. The high speed, short stroke reciprocation at which mower sickle bars are driven entails the starting, stopping, and reversing of direction of the mass of the sickle bar many times per minute. Mowers are frequently subject to additional shock loads upon striking foreign objects such as stones which may lie in their path of movement. While forces acting normal to the plane of reciprocation may be permissible in some mechanisms employing straight line motion, mechanism which is subject to the stress that mower parts receive in normal operation can ill afford to contend with such forces.

It is an object of this invention to provide rugged mechanism for driving a reciprocable member, such as a mower sickle bar, in straight line reciprocation.

Another object of this invention is to provide mechanism which is compact in size and economical to produce and which will drive a member, such as a mower sickle bar, in straight line reciprocation.

Another object of this invention is to eliminate the need for guide members at the head of a reciprocable member by providing mechanism which will drive a reciprocable member, such as a mower sickle bar, in straight line reciprocation.

It is another object of this invention to provide a reciprocable mower drive mechanism having low maintenance cost and long service life.

A further object of this invention is to provide linkage for guiding, or driving, a member in straight line reciprocation wherein said linkage is completely disposed to one side of the plane of reciprocation of the driven member.

It is another object of this invention to provide linkage for driving, or guiding, a reciprocable member wherein the geometry of said linkage is designed to produce straight line reciprocation of the member to be driven or guided.

Still another object of this invention is to provide novel linkage for converting rotary or oscillating motion to straight line reciprocating motion.

These and other objects of the invention will become more apparent from the specification and drawings wherein:

FIG. 1 is a fragmentary side elevational view of a reciprocable mower embodying the drive linkage of this invention.

FIG. 2 is a fragmentary plan view of the mechanism shown in FIG. 1.

FIG. 3 is a sectional view taken on the line 3—3 in FIG. 1.

FIGS. 4 through 7 are diagrammatic views of a preferred embodiment of the linkage of this invention; the parts being shown at various points of a working stroke.

FIGS. 8 through 11 are diagrammatic views showing a modification of the linkage of this invention; the parts being shown at various points of a working stroke.

Figure 12:
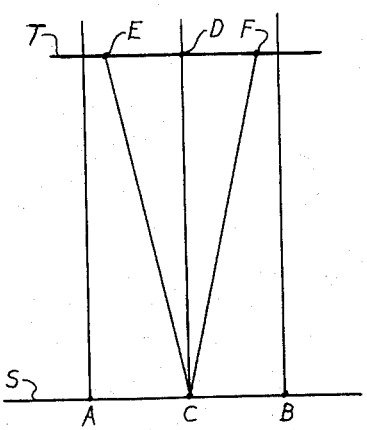
FIGS. 12 through 16 are drawings showing the geometry of the drive linkage of this invention and the procedure followed in locating the various pivot axes of this linkage.

With reference to the drawings, and in particular to FIGS. 1 through 3, the numeral 15 indicates, generally, the drive mechanism of a reciprocable mower of the type that have come to be known as "pitmanless" mowers. Certain parts seen here will be recognized as parts which are common to many, if not all, pitmanless mowers. For example, the numeral 16 indicates a skid, or ground shoe. Shoe 16 carries an innershoe 18 (FIG. 3) which forms a part of the supporting structure for a conventional cutterbar assembly 19. A sickle bar 20 is carried by cutterbar 19 and is held thereon by clip members 21 (FIG. 2) spaced at intervals along the length of the sickle bar. Clips 21 permit sickle bar 20 to reciprocate on cutterbar 19 along the longitudinal axis of the sickle bar. A plurality of knives 22 are carried by sickle bar 20. Guard members 24, carried by cutterbar 19, protect the knives 22 while providing fixed shear members, or ledgers, 25 with which the knife members 22 cooperate to shear crop material. As is conventional, a second ground shoe (not shown) is provided at the other end of cutterbar 19.

A pair of generally vertically extending support members 26 and 28 are bolted to innershoe member 18. Members 26 and 28 serve both as housing and support for the sickle bar drive mechanism. The housing and support, comprising members 26 and 28, is connected to a tractor, or other supporting structure (not shown), by members 29 and 30. Member 30 is pivotally connected to member 28 by a pin 31 best seen in FIG 3. Member 29 carries a sleeve 32 which surrounds the crank shaft of the drive mechanism adjacent support member 26 (see FIG. 3). Pin 31 and the crank shaft of the drive mechanism are coaxially disposed on support 26—28. The housing and cutterbar assembly may be pivoted upwardly about this axis when it is desired to raise the cutterbar off the ground. To accomplish this, an arm 34 is fixed to support member 26 and extends vertically therefrom. A chain 35 extends from arm 34 to conventional mechanism, not shown, which may be selectively actuated to raise the mower about the axis of pin 31. The previously mentioned crank shaft is designated by the reference numeral 36. This crank shaft carries a combined flywheel-pulley 38. A drive belt 39 extends from pulley 38 to the PTO shaft of the tractor, or to other conventional drive means, not shown. The aforementioned parts are known, in one form or another, in current "pitmanless" mowers. It is the mechanism for converting the rotary motion of flywheel-pulley 38 to straight line reciprocation of sickle bar 20 to which this invention relates. This mechanism will now be described in connection with FIGS. 4-7 of the drawings, as well as FIGS. 1-3.

The crank 36 is rotatably mounted in a bearing block 40 formed integrally with support member 26. A short connecting rod 41 extends from crank pin 42 (see FIG. 1) to a pivot pin, or stud, 51 which is carried by a rocker member 45. A counter-weight 46 is formed integrally with crank 36 and is disposed 180° out of phase with crank pin 42. Weight 46 counterbalances the mass of sickle bar 20 which reciprocates around 900 strokes per minute, and thus changes direction 1800 times per minute, in normal operation.

Rocker member 45 comprises a pair of plates 47 and 48 (FIGS. 2 and 3) rigidly interconnected and spaced apart by a plurality of shoulder studs 49, 50, 51 and 52. The relative locations of these studs may best be seen in FIGS. 4-7. Studs 49 and 50, respectively, provide first and second pivotal connection points for first and second supporting links 54 and 55. The other ends of links 54 and 55 are pivotally supported on shoulder bolts 56 and 57. The bolts 56 and 57 extend between support members 26 and 28 and constitute fixed pivot axes for links 54 and 55. As seen in FIGS. 4-7 the rocker member 45 is oscillatible simultaneously on links 54 and 55 as the links 54 and 55 oscillate in opposite directions about their fixed pivot axes 56 and 57. In FIGS. 2 and 3, it will be seen that the rocker member is mounted for oscillation in a plane common to the axis of reciprocation of sickle bar 20.

Rocker 45 is oscillated on links 54 and 55 by connecting rod 41 which is pivotally connected to the shoulder stud 51 on the rocker member. The stud 51 is disposed below studs 49 and 50 on the preferred embodiment. This location enables the mechanism to be kept as compact as possible. If it were desired, however, the stud 51 could be located elsewhere; or other means entirely could be employed to oscillate rocker member 45.

The stud 52 is located at the lower most part of rocker member 45 and pivotally carries the drive head 58 of sickle bar 20. Thus, sickle bar 20 is reciprocated by stud 52 when rocker member 45 is oscillated on links 54 and 55 by connecting rod 44.

A modification of the above linkage is shown in FIGS. 8-11. In these figures the parts bear "primed" reference numerals corresponding to the numerals of similar parts in the preferred embodiment. The modification merely shows an alternate position at which the connecting rod may be attached to the rocker member.

In both the preferred embodiment and the modification, certain members and pivot points are so related geometrically that the axis of stud 52 (or 52') reciprocates in a straight line when the rocker member is oscillated on its supporting links. This geometry and the procedure for locating the various link lengths and pivot points will now be described.

The axes of all the pivot members are parallel and the axes of studs 49, 50 and 52 are so located on the rocker member that they lie on the vertices of an isosceles triangle whose base extends between studs 49 and 50 and whose equal sides intersect at stud 52. This obviously does not require that rocker member 45 be triangular in shape. The links 54 and 55 are equal in length. The term length as employed herein is intended to means the effective length, or the length between pivot axes. The lengths of links 54 and 55 and the location of fixed axes 56 and 57 are determinable by the following steps:

(1) A line S is drawn and the limits of the desired stroke length are marked thereon as at A and B in FIG. 12. The midpoint C of the stroke is also marked.

(2) Vertical parallel lines are drawn upwardly from points A, B and C and a point D is arbitrarily marked on the vertical line extending from point C. The line C D represents the altitude of the aforementioned isosceles triangle.

(3) The points E and F are arbitrarily marked off at equal distances from point D on a line T which is parallel to line S. The vertices of triangle C E F indicate the locations of studs 52, 49 and 50, respectively, at the midpoint of the stroke.

Figure 13:
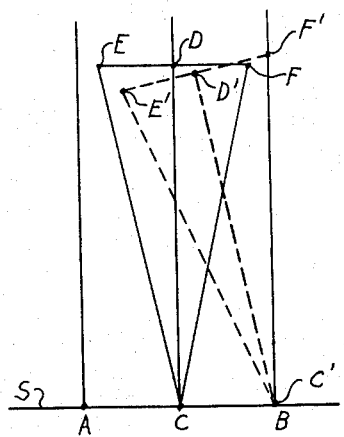

(4) As seen in FIG. 13, the triangle C E F is next transposed so that side C F lies on the vertical line extending upwardly from point B with vertex C' lying on point B. This locates points E, E' F and F' which represent the locations of studs 49 and 50 at the center and one extreme limit of the stroke.

Figure 14:
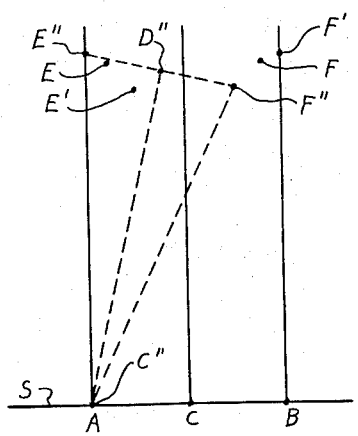

(5) Next, in FIG. 14, the triangle C E F is transposed so that side C E lies on the vertical line extending upwardly from point A with vertex C" lying on point A. Points E" and F" represent the locations of studs 49 and 50 at the other limit of the stroke.

Figure 15:
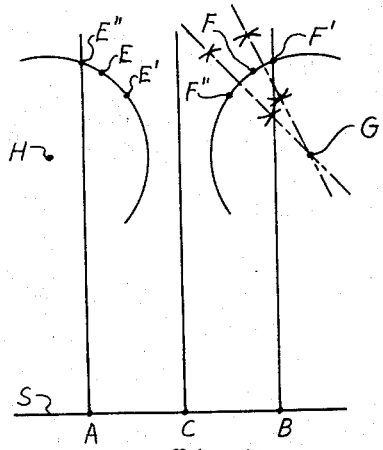

(6) The centers G and H of circles through points E, E' and E" and F, F' and F" are located at the point of intersection of the bisectors of cords E"—E and E—E' and F'—F and F—F" as seen in FIG. 15. The centers G and H represent the locations of fixed pivots 56 and 57.

Figure 16:
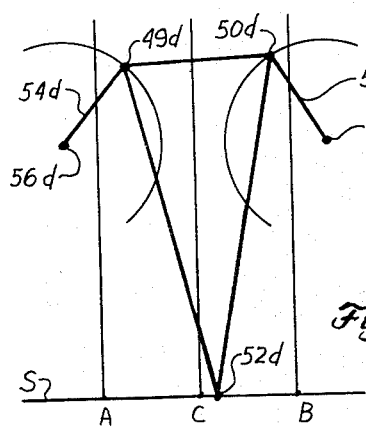

FIG. 16 shows, diagrammatically, the linkage at an intermediate point in the stroke. Previously identified links and pivots are marked with the subletter "d."

From the above steps it will be seen that the size of the isosceles triangle is arbitrarily chosen. This will be determined by factors such as the space available for the mechanism. The limits A and B of the stroke are the points on line S where the equal sides of triangle C E F becomes perpendicular to line S, or perpendicular to a line between centers G and H (FIG. 15).

It will be appreciated that the above linkage could be employed as a guiding device alone in the absence of driving means.

The stud 51 which carries one end of connecting rod 41 is preferably located on the altitude of the isosceles triangle or, as in the modification shown in FIGS. 4-7, on the perpendicular bisector of the base of the isosceles triangle. Naturally, the connection point at 51 and the throw of crank 36 are so chosen that they do not oscillate rocker 45 beyond the above defined stroke limits. It will also be appreciated that instead of driving rocker 45, one of the links 54 or 55 could carry the driving member.

As may be seen in FIG. 3, with the drive linkage of this invention no guides are employed at drive head 58 of sickle bar 20. Guides are unnecessary since this linkage directs all the driving force from pin 52 to head 58 in a straight line in the direction of reciprocation of sickle bar 20. This produces an efficient drive and eliminates all the problems related to conventional guides by eliminating the need for these guides.

While this invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A reciprocating mower comprising a sickle bar, a fixed support at one end of said sickle bar, a rocker member, a first link having one end mounted on said support for pivotal movement about a first fixed axis and the other end pivotally supporting said rocker member at a first pivot point thereon, a second link having one end mounted on said support for pivotal movement about a second fixed axis spaced from said first fixed axis and the other end pivotally supporting said rocker member at a second pivot point thereon spaced from said first pivot point, means providing a third pivot point on said rocker member, said first, second and third pivot points being so relatively located that they lie respectively on the vertices of an isosceles triangle whose base extends between said first and second pivot points, means connected to said rocker member for oscillating the rocker member on said first and second links simultaneously, the length of said links and the locations of said fixed axes being so geometrically related to the base and altitude of said triangle that said third point reciprocates in a straight line when said rocker member is oscillated on said links, and means pivotally connecting said one end of said sickle bar to said rocker member at said third pivot point.

2. A reciprocating mower comprising a sickle bar reciprocable along its longitudinal axis, a fixed support at one end of said sickle bar, a rocker member, a first link having one end mounted on said support for pivotal movement about a first fixed axis and the other end pivotally supporting said rocker member at a first pivot point thereon, a second link equal in length to said first link and having one end mounted on said support for pivotal movement about a second fixed axis parallel to and spaced from said first fixed axis, the other end of said second link pivotally supporting said rocker member at a second pivot point thereon spaced from said first pivot point, means providing a third pivot point on said rocker member, said first and second fixed axes lying on a line parallel to the longitudinal axis of said sickle bar and said first, second and third pivot points lying respectively on the vertices of an isosceles triangle whose base extends between said first and second pivot points, means connected to said rocker member for oscillating the rocker member on said first and second links simultaneously, the length of said links and the positioning of said fixed axes being so geometrically related to the base and altitude of said triangle that said third pivot point reciprocates in a straight line when said rocker member is oscillated on said links, and means pivotally connecting said one end of said sickle bar to said rocker member at said third pivot point.

3. A reciprocating mower comprising a support, a cutter bar having one end mounted on said support, a sickle bar mounted on said cutter bar for reciprocation relative thereto along the longitudinal axis of said sickle bar, a rocker member, a first link having one end pivotally mounted on said support and the other end pivotally supporting said rocker member at a first point thereon, a second link having one end pivotally mounted on said support and the other end pivotally supporting said rocker member at a second point thereon spaced from said first point, a crank carried by said support and connected to said rocker member for oscillating the rocker member on said links, means connecting one end of said sickle bar to said rocker member at a third point thereon, said first, second and third points on the rocker member lying respectively on the vertices of an isosceles triangle whose base extends between said first and second points, said third point lying substantially on the longitudinal axis of said sickle bar, the lengths and pivotal mounting points of said links and the throw of said crank being so geometrically related to the base and altitude of said isosceles triangle that when said rocker member is oscillated on said first and second links simultaneously by said crank, said third point reciprocates in a straight line thereby driving said sickle bar in straight line reciprocation.

4. A reciprocating mower comprising a support having first and second parallel pivot members fixedly located thereon, a cutter bar having one end fixedly mounted on said support, said cutter bar extending outwardly from said support in a direction perpendicular to the axes of said pivot members and spaced therefrom, a sickle bar mounted on said cutter bar for reciprocation therealong, a rocker member, a first link having one end pivotally mounted on said first pivot member and the other end pivotally connected to said rocker member at a first point thereon, a second link having one end pivotally mounted on said second pivot member and the other end pivotally connected to said rocker member at a second point thereon, said rocker member being supported by said links for oscillation simultaneously about first and second parallel axes through said first and second points and parallel to the axes of said first and second fixed pivot members upon simultaneous oscillation of said links about said first and second fixed pivot members, means connected to said rocker member for oscillating the rocker member on said links, a connection member located at a third point on said rocker member, said third point lying on the vertex of an isosceles triangle whose other two vertices lie respectively on said first and second points on said rocker member and whose base extends between said first and second points, and means connecting one end of said sickle bar to said connection member, the base and altitude of said isosceles triangle being so geometrically related to the lengths of said links and the location of said fixed pivot members that said connection member reciprocates in a straight line when said rocker member is oscillated on said links thereby driving said sickle bar in straight line reciprocation.

5. A reciprocating mower as recited in claim 4 wherein said means for oscillating the rocker member on said links comprises a crank carried by said support for rotation about an axis parallel to the axes of said first and second fixed pivot members.

6. A reciprocating mower as recited in claim 5 wherein a connecting rod extends from said crank to said rocker member and has one end pivotally connected to said crank and the other end pivotally connected to said rocker member at a fourth point thereon, said fourth point lying on the perpendicular bisector of the base of said isosceles triangle.

7. A reciprocating mower as recited in claim 6 wherein said fourth point lies between the base of said triangle and the connection member.

8. A reciprocating mower as recited in claim 6 wherein said fourth point and said connection member lie on opposite sides of the base of said isosceles triangle.

9. A reciprocating mower as recited in claim 7 wherein said fixed pivot members are disposed in a substantially horizontal plane and said rocker member oscillates in a generally vertical plane, said connection member being carried at the lowermost extremity of said rocker member.

References Cited in the file of this patent
UNITED STATES PATENTS

| | | |
|---|---|---|
| 736,753 | Marcus | Aug. 18, 1903 |
| 2,691,863 | Krause | Oct. 19, 1954 |
| 2,867,070 | McCall et al. | Jan. 6, 1959 |
| 2,912,814 | Witt et al. | Nov. 17, 1959 |
| 2,942,483 | Evans et al. | June 28, 1960 |
| 3,000,226 | Muehlhausen | Sept. 19, 1961 |